(12) United States Patent
Liu

(10) Patent No.: US 10,820,262 B2
(45) Date of Patent: Oct. 27, 2020

(54) PAGING METHOD AND DEVICE

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 0 days.

(21) Appl. No.: 16/458,720

(22) Filed: Jul. 1, 2019

(65) Prior Publication Data

US 2019/0327669 A1    Oct. 24, 2019

Related U.S. Application Data

(63) Continuation of application No. PCT/CN2017/070250, filed on Jan. 5, 2017.

(51) Int. Cl.
| | |
|---|---|
| *H04W 68/02* | (2009.01) |
| *H04W 48/16* | (2009.01) |
| *H04W 76/27* | (2018.01) |
| *H04W 16/28* | (2009.01) |

(52) U.S. Cl.
CPC ........... *H04W 48/16* (2013.01); *H04W 16/28* (2013.01); *H04W 68/02* (2013.01); *H04W 76/27* (2018.02)

(58) Field of Classification Search
CPC ..... H04W 48/16; H04W 76/27; H04W 16/28; H04W 68/02; H04W 68/005; H04B 7/0695; H04B 7/04; H04B 7/02
See application file for complete search history.

(56) References Cited

U.S. PATENT DOCUMENTS 10,492,137 B2 *  11/2019  Kwon .................. H04W 76/28
2005/0079870 A1   4/2005  Rick et al.
(Continued)

FOREIGN PATENT DOCUMENTS

| CN | 101146333 A | 3/2008 |
|---|---|---|
| CN | 101669384 Y | 3/2010 |

(Continued)

OTHER PUBLICATIONS

International search report of PCT application No. PCT/CN2017/070250 dated Sep. 6, 2017.

(Continued)

*Primary Examiner* — Christopher M Brandt
(74) *Attorney, Agent, or Firm* — Syncoda LLC; Feng Ma

(57) ABSTRACT

A paging method includes: determining a paging signal to be sent currently for a target cell, wherein the paging signal carries identifiers of terminals to be paged in the target cell, the target cell comprises n scanning areas corresponding to n beam scanning nodes respectively, the n beam scanning nodes are selected by a base station from m beam scanning nodes set for the target cell, the target cell is a cell, to which the paging signal is to be sent; determining a scanning start point of each of the corresponding scanning areas on which the beam scanning is performed by the n beam scanning nodes respectively; and performing beam scanning on the corresponding scanning areas by the n beam scanning nodes respectively so as to send the paging signal to the terminals in the corresponding scanning areas by beam scanning.

20 Claims, 9 Drawing Sheets determining a paging signal to be sent currently for a target cell, wherein the paging signal carries identifiers of terminals to be paged in the target cell, the target cell comprises n scanning areas corresponding to n beam scanning nodes respectively, the n beam scanning nodes are selected by a base station from m beam scanning nodes set for the target cell, the target cell is a cell, to which the paging signal is to be sent, of at least one cell managed by the base station, m is an integer greater than 1, and n is an integer greater than 1 and less than or equal to m — 101 determining a scanning start point of each of the corresponding scanning areas on which the beam scanning is performed by the n beam scanning nodes respectively — 102 performing, based on the paging signal, and a beam scanning start point and a preset scanning direction of each of the n beam scanning nodes, beam scanning on the corresponding scanning areas by the n beam scanning nodes respectively so as to send the paging signal to the terminals in the corresponding scanning areas by beam scanning — 103

(56) References Cited

U.S. PATENT DOCUMENTS

| | | | | |
|---|---|---|---|---|
| 2014/0128109 A1* | 5/2014 | Li | ......................... | H04W 68/02 |
| | | | | 455/458 |
| 2015/0358129 A1* | 12/2015 | Ryu | ................. | H04W 36/0072 |
| | | | | 455/438 |
| 2016/0127919 A1* | 5/2016 | Hui | ...................... | H04W 16/28 |
| | | | | 342/371 |
| 2019/0239192 A1* | 8/2019 | Tang | .................... | H04W 68/02 |

FOREIGN PATENT DOCUMENTS

| | | | |
|---|---|---|---|
| CN | 101895968 | A | 11/2010 |
| CN | 10221572 | A | 10/2011 |
| CN | 104969588 | A | 10/2015 |
| CN | 105850189 | A | 8/2016 |
| WO | WO2016065590 | A1 | 5/2016 |

OTHER PUBLICATIONS

First office action of Chinese application No. 201780000001.8 dated Aug. 26, 2019.

\* cited by examiner determining a paging signal to be sent currently for a target cell, wherein the paging signal carries identifiers of terminals to be paged in the target cell, the target cell comprises n scanning areas corresponding to n beam scanning nodes respectively, the n beam scanning nodes are selected by a base station from m beam scanning nodes set for the target cell, the target cell is a cell, to which the paging signal is to be sent, of at least one cell managed by the base station, m is an integer greater than 1, and n is an integer greater than 1 and less than or equal to m ⎯ 101 determining a scanning start point of each of the corresponding scanning areas on which the beam scanning is performed by the n beam scanning nodes respectively ⎯ 102 performing, based on the paging signal, and a beam scanning start point and a preset scanning direction of each of the n beam scanning nodes, beam scanning on the corresponding scanning areas by the n beam scanning nodes respectively so as to send the paging signal to the terminals in the corresponding scanning areas by beam scanning ⎯ 103

FIG. 1B

PAGING METHOD AND DEVICE

CROSS-REFERENCE TO RELATED APPLICATION

This application is a continuation application of International Application No. PCT/CN2017/070250 filed on Jan. 5, 2017, the disclosure of which is incorporated herein by reference in its entirety.

BACKGROUND

In a wireless communication system, a base station needs to send a paging signal to a managed cell. The paging signal carries identifiers of terminals to be paged in a certain cell, so that the terminals to be paged in the cell can be paged according to the paging signal to initiate a paging response.

SUMMARY

The present disclosure relates to the field of mobile communication technologies, and in particular, to a paging method and device.

Various embodiments of the present disclosure provide a paging method and device, wherein the paging signal is also sent by means of beam scanning so as to allow for transmission over the 5G network.

In order to implement beam scanning, for each cell managed by the base station, a beam scanning node such as a Transmission Reception Point, i.e. TRP, can be provided by the base station. Beam scanning node can then be configured to generate a beam and scan the cell by the generated beam. Additionally, the paging signal can be sent to the scanned area by the beam during the beam scanning.

Specifically, the base station can first determine the paging signal, determine a correspondence between the paging signal and the current cell to which the page is to be sent, and determine a preset scanning start point and a preset scanning direction of the beam scanning node in the cell. Then beam scanning is performed, according to the paging signal, the preset scanning start point, and the preset scanning direction, wherein the paging signal can then be sent to, and received by, the terminal in the corresponding cell by the aforementioned beam scanning process as discussed above.

The technical solutions which represent solutions to existing problems or improvements of existing methods are as follows:

In a first aspect, there is provided a paging method including the steps of:

determining a paging signal to be sent currently for a target cell, wherein the paging signal carries identifiers of terminals to be paged in the target cell, the target cell includes n scanning areas corresponding to n beam scanning nodes respectively, the n beam scanning nodes are selected by a base station from m beam scanning nodes set for the target cell, the target cell is a cell, to which the paging signal is to be sent, of at least one cell managed by the base station, m is an integer greater than 1, and n is an integer greater than 1 and less than or equal to m;

determining a scanning start point of each of the corresponding scanning areas on which the beam scanning is performed by the n beam scanning nodes respectively; and performing, based on the paging signal, and a beam scanning start point and a preset scanning direction of each of the n beam scanning nodes, beam scanning on the corresponding scanning areas by the n beam scanning nodes respectively so as to send the paging signal to the terminals in the corresponding scanning areas by beam scanning.

In some embodiments, before a scanning start point of each of the corresponding scanning areas on which the beam scanning is performed by the n beam scanning nodes respectively, further including:

determining the number and locations of the terminals to be paged;

selecting, based on the number of the terminals to be paged, the n beam scanning nodes from the m beam scanning nodes set by the base station for the target cell; and dividing, based on the n beam scanning nodes and the locations of the terminals to be paged, the target cell into the n scanning areas corresponding to the n beam scanning nodes respectively.

In some embodiments, wherein determining a scanning start point of each of the corresponding scanning areas on which the beam scanning is performed by the n beam scanning nodes respectively, includes:

determining delay capabilities of the terminals to be paged, wherein the delay capabilities are configured to indicate delays required by the terminals to be paged to receive the paging signal; and determining, based on the delay capabilities of the terminals to be paged, the scanning start points of the n beam scanning nodes for performing beam scanning on the corresponding scanning areas.

In some embodiments, wherein determining, based on the delay capabilities of the terminals to be paged, the scanning start points of the n beam scanning nodes for performing beam scanning on the corresponding scanning areas, includes:

determining, based on the delay capabilities of the terminals to be paged, whether the terminals to be paged include a low-delay terminal, wherein the low-delay terminal refers to a terminal that the delay required to receive the paging signal is less than a preset threshold;

determining a location of the low-delay terminal when the terminals to be paged include a low-delay terminal; and determining, based on the location of the low-delay terminal, the scanning start point of a target beam scanning node for performing beam scanning on a target scanning area, wherein the target beam scanning node is a beam scanning node corresponding to the target scanning area, and the target scanning area is a scanning area in the n scanning areas where the low-delay terminal is currently located.

In some embodiments, wherein performing beam scanning on the corresponding scanning areas by the n beam scanning nodes respectively based on the paging signal, and the beam scanning start point and the preset scanning direction of each of then beam scanning nodes, so as to send the paging signal to the terminals in the corresponding scanning areas by beam scanning, includes:

performing beam scanning on the target scanning area, based on the paging signal, and the beam scanning start point and the preset scanning direction of the target beam scanning node, for the target beam scanning node, so as to send the paging signal to the low-delay terminal by beam scanning;

determining, after performing beam scanning on the target scanning area, a preset scanning start point of the target beam scanning node; and continuously performing beam scanning on the target scanning area based on the paging signal, the preset scanning start point, and the preset scanning direction, so as to send the paging signal to other terminals than the low-delay terminal in the target scanning area by beam scanning.

In some embodiments, wherein determining a location of the low-delay terminal includes:

determining the location of the low-delay terminal based on a location at which the low-delay terminal is connected to the base station by radio resource control (RRC) at the last time before the current time.

In some embodiments, before performing beam scanning on the corresponding scanning areas by the n beam scanning nodes respectively based on the paging signal, and the beam scanning start point and the preset scanning direction of each of then beam scanning nodes, further including:

sending notification information to the terminals in the target cell, wherein the notification information includes time domain location information and frequency domain location information of the paging signal.

In a second aspect, there is provided a paging device, including:

a first determining module, configured to determine a paging signal to be sent currently for a target cell, wherein the paging signal carries identifiers of terminals to be paged in the target cell, the target cell includes n scanning areas corresponding to n beam scanning nodes respectively, the n beam scanning nodes are selected by a base station from m beam scanning nodes set for the target cell, the target cell is a cell, to which the paging signal is to be sent, of at least one cell managed by the base station, m is an integer greater than 1, and n is an integer greater than 1 and less than or equal to m;

a second determining module, configured to determine a scanning start point of each of the corresponding scanning areas on which the beam scanning is performed by the n beam scanning nodes respectively; and a scanning module, configured to perform, based on the paging signal, and a beam scanning start point and a preset scanning direction of each of the n beam scanning nodes, beam scanning on the corresponding scanning areas by the n beam scanning nodes respectively so as to send the paging signal to the terminals in the corresponding scanning areas by beam scanning.

In some embodiments, the device further includes:

a third determining module, configured to determine the number and locations of the terminals to be paged;

a selecting module, configured to select, based on the number of the terminals to be paged, the n beam scanning nodes from the m beam scanning nodes set by the base station for the target cell; and a dividing module, configured to divide, based on the n beam scanning nodes and the locations of the terminals to be paged, the target cell into the n scanning areas corresponding to the n beam scanning nodes respectively.

In some embodiments, wherein the second determining module includes:

a first determining sub-module, configured to determine delay capabilities of the terminals to be paged, wherein the delay capabilities are configured to indicate delays required by the terminals to be paged to receive the paging signal; and a second determining sub-module, configured to determine, based on the delay capabilities of the terminals to be paged, the scanning start points of the n beam scanning nodes for performing beam scanning on the corresponding scanning areas.

In some embodiments, wherein the second determining module includes:

a judging sub-module, configured to determine, based on the delay capabilities of the terminals to be paged, whether the terminals to be paged include a low-delay terminal, wherein the low-delay terminal refers to a terminal that the delay required to receive the paging signal is less than a preset threshold;

a third determining sub-module, configured to determine a location of the low-delay terminal when the terminals to be paged include a low-delay terminal; and a fourth determining sub-module, configured to determine, based on the location of the low-delay terminal, the scanning start point of a target beam scanning node for performing beam scanning on a target scanning area, wherein the target beam scanning node is a beam scanning node corresponding to the target scanning area, and the target scanning area is a scanning area in the n scanning areas where the low-delay terminal is currently located.

In some embodiments, wherein the scanning module includes:

a first scanning sub-module, configured to perform beam scanning on the target scanning area based on the paging signal, and the beam scanning start point and the preset scanning direction of the target beam scanning node for the target beam scanning node, so as to send the paging signal to the low-delay terminal by beam scanning;

a fifth determining sub-module, configured to determine, after performing beam scanning on the target scanning area, a preset scanning start point of the target beam scanning node; and a second scanning sub-module, configured to continuously perform beam scanning on the target scanning area based on the paging signal, the preset scanning start point, and the preset scanning direction, so as to send the paging signal to other terminals than the low-delay terminal in the target scanning area by beam scanning.

In some embodiments, wherein the third determining sub-module is configured to determine the location of the low-delay terminal based on a location at which the low-delay terminal is connected to the base station by radio resource control (RRC) at the last time before the current time.

In some embodiments, the device further includes:

a sending module, configured to send notification information to the terminals in the target cell, wherein the notification information includes time domain location information and frequency domain location information of the paging signal.

In a third aspect, there is provided a paging device, including:

a processor; and a memory for storing instructions executable by the processor;

wherein the processor is configured to:

determine a paging signal to be sent currently for a target cell, wherein the paging signal carries identifiers of terminals to be paged in the target cell, the target cell includes n scanning areas corresponding to n beam scanning nodes respectively, the n beam scanning nodes are selected by a base station from m beam scanning nodes set for the target cell, the target cell is a cell, to which the paging signal is to be sent, of at least one cell managed by the base station, m is an integer greater than 1, and n is an integer greater than 1 and less than or equal to m;

determine a scanning start point of each of the corresponding scanning areas on which the beam scanning is performed by the n beam scanning nodes respectively; and perform, based on the paging signal, and a beam scanning start point and a preset scanning direction of each of the n beam scanning nodes, beam scanning on the corresponding scanning areas by the n beam scanning nodes respectively so as to send the paging signal to the terminals in the corresponding scanning areas by beam scanning.

The technical solution provided by the examples of the present disclosure has the following beneficial effects.

In examples of the present disclosure, the current paging signal, corresponds to the target cell, to be sent can be determined. The beam scanning is performed, based on the paging signal, the beam scanning start point and the preset scanning direction of each of the n beam scanning nodes, on the corresponding scanning areas by the n beam scanning nodes respectively, so as to send the paging signal to the terminals in the corresponding scanning areas, and n is greater than 1. Beam scanning is performed on the corresponding scanning areas of the cell by the n beam scanning nodes respectively, that is, parallel scanning can be performed by the n beam scanning nodes. Therefore, the time required for performing beam scanning of the cell is greatly saved, and the efficiency of sending the paging signal to the terminal in the cell based on beam scanning is improved, thereby further reducing the delay that the terminal receives paging.

BRIEF DESCRIPTION OF THE DRAWINGS

To describe the technical solutions in the examples of the present disclosure more clearly, the following briefly introduces the accompanying drawings required for describing the examples. As such, the accompanying drawings in the following description show merely some examples of the present disclosure, and a person of ordinary skill in the art can still derive other drawings from these accompanying drawings without creative efforts, wherein:

FIG. 1B illustrates a flowchart of a paging method according to an example;

DETAILED DESCRIPTION

Figure 1A:
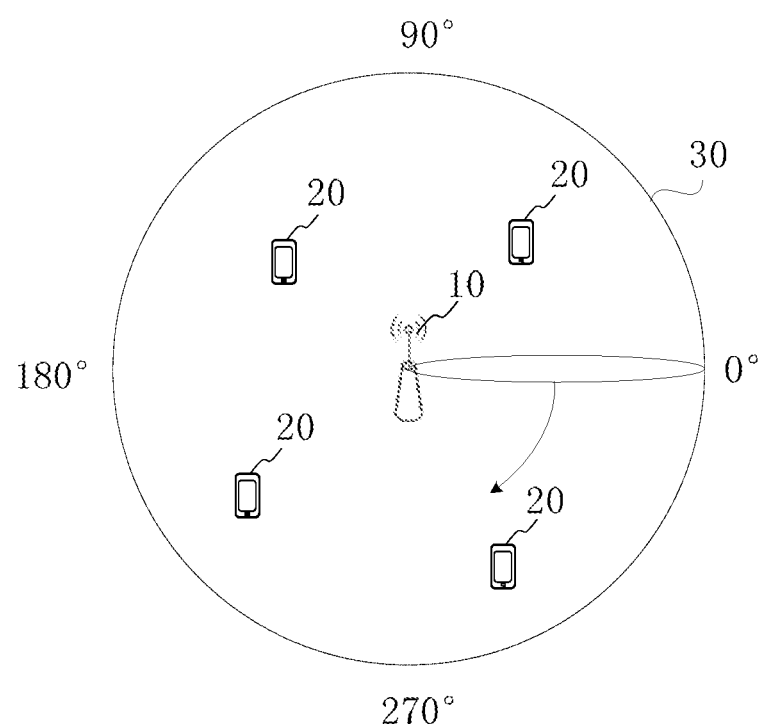
FIG. 1A illustrates a schematic diagram of a wireless communication system according to an example.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. can be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or other structure is referred to as being "on" or extending "onto" another element, it can be directly on or extend directly onto the other element or intervening elements can also be present. In contrast, when an element is referred to as being "directly on" or extending "directly onto" another element, there are no intervening elements present.

Likewise, it will be understood that when an element is referred to as being "connected" or extending "to" another element, such an element can be directly over or extend directly over the other element or intervening elements can also be present. In contrast, when an element is referred to as being "directly connected" or extending "directly to" another element, there are no intervening elements present. It will also be understood that when an element is referred to as being "connected" or "coupled" to another element, it can be directly connected or coupled to the other element or intervening elements can be present. In contrast, when an element is referred to as being "directly connected" or "directly coupled" to another element, there are no intervening elements present.

Relative terms such as "below" or "above" or "upper" or "lower" or "horizontal" or "horizontal" can be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms, including technical and scientific terms, used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, with the promotion of 5G (The Fifth Generation Mobile Communication Technology) related standards, a mechanism for sending the signal based on beam scanning is introduced in the 5G system, so the paging signal also needs to be sent by the beam scanning.

In the related art, in order to implement beam scanning, for each cell managed by the base station, a beam scanning node such as a TRP (Transmission Reception Point) may be provided by the base station may provide in the cell. Beam scanning node is configured to generate a beam and scan the cell by the generated beam. Besides, the paging signal can be sent to the scanned area by the beam during the beam scanning. Specifically, the base station may firstly determine the paging signal, corresponds to the current cell, to be sent, and determine a preset scanning start point and a preset scanning direction of the beam scanning node in the cell. Then beam scanning is performed, according to the paging signal, the preset scanning start point and the preset scanning direction, and the paging signal is sent to the terminal in the cell by beam scanning.

Before explaining the examples of the present disclosure in detail, the implementation environment of the examples of the present disclosure will be described so as to establish an appropriate context. As such, the paging method provided by the examples of the present disclosure is applied to a wireless communication system, wherein FIG. 1A illustrates a schematic diagram of a wireless communication system according to one example. In particular reference to FIG. 1A, an exemplary wireless communication system can include a base station 10 and a plurality of terminals 20. In addition, with the promotion of Fifth Generation Mobile Communication Technology, i.e. 5G related standards, a mechanism is contemplated herein for sending the signal based on beam scanning is introduced in the 5G system.

In this exemplary system, the base station 10 can be utilized to divide the coverage into one or more cells for management respectively. In such systems, the plurality of terminals 20 can then be located in respective cells of the base station 10. In this manner, the base station 10 can be utilized so as to divide the coverage area into one cell, and the plurality of terminals 20 are located in the same cell.

In addition, in order to adapt to a 5G system, the base station in such a system needs to send a paging signal to the terminals in the managed cell by means of a beam scanning operation. In the related art, in order to implement beam scanning, the base station can set a beam scanning node for each managed cell. When the paging signal needs to be sent to a certain cell, a preset scanning start point and a preset scanning direction of the beam scanning node of the cell can be determined first. Then beam scanning is performed on the cell according to the paging signal, the preset scanning start point, and the preset scanning direction, so as to send the paging signal to the terminals in the cell by beam scanning.

By taking FIG. 1A as an example, the base station 10 serves for a circular cell 30 in which the base station 10 is located at a central point. As illustrated here, it is assumed that the horizontal rightward 0° position in the figure is taken as the preset scanning start point, and the clockwise direction is taken as the preset scanning direction. In this manner, the paging signal can be sent to the cell, by a beam generated through the beam scanning node. Additionally, beam scanning for the cell can be completed by scanning for a circle in the clockwise direction with the 0° position as the scanning start point. It can then be assumed that the time required for performing beam scanning on the cell is T, then the base station needs at least time T to send the paging signal to all terminals in the cell. Therefore, the efficiency of sending the paging signal is relatively low, and the delay that the terminal receives the paging is relatively large. In order to solve the problems in the related art, the present disclosure provides a paging method, which is described in detail below.

FIG. 1B is a flowchart of a paging method according to various alternative examples being illustrative of various concepts of the present disclosure. The execution of the illustrated method can be implemented by a typical base station as will be understood by those having skill in the art.

As shown in FIG. 1B, the method mainly includes the following steps:

As illustrated in step 101, the paging method can include: determining a paging signal to be sent currently for a target cell, wherein the paging signal carries identifiers of terminals to be paged in the target cell, the target cell includes n scanning areas corresponding to n beam scanning nodes respectively, the n beam scanning nodes are selected by a base station from m beam scanning nodes and set for the target cell. In such an embodiment, the target cell is any one of the illustrated cell, to which the paging signal is intended to be sent, of at least one cell managed by the base station, wherein m is an integer greater than 1, and wherein n is an integer greater than 1 and less than or equal to m.

As illustrated in step 102, the paging method can include: determining a scanning start point of each of the corresponding scanning areas on which the beam scanning is performed by the n beam scanning nodes respectively.

As illustrated in step 103, the paging method can include: performing beam scanning on each of the corresponding scanning areas by the n beam scanning nodes respectively based on the paging signal, the beam scanning start point, and a preset scanning direction of each of the n beam scanning nodes. In this manner the system can send the paging signal to the terminals in the corresponding scanning areas by beam scanning.

In some examples of the present disclosure, a particular paging signal which is intended to be sent currently for the target cell can be determined, wherein based on the paging signal, the beam scanning start point, and the preset scanning direction of each of the n beam scanning nodes, beam scanning is performed on the corresponding scanning areas by the n beam scanning nodes respectively, so as to send the paging signal to the terminals in the corresponding scanning areas, wherein n is greater than 1. Beam scanning can then be performed on the corresponding scanning areas of the cell by the n beam scanning nodes respectively, in other words, parallel scanning can be performed by the n beam scanning nodes. Therefore, the time required for performing beam scanning of the cell is greatly saved, as each scanning area is reduced to be only a portion of the entire scanning area, and the efficiency of sending the paging signal to the terminal in the cell based on beam scanning is improved, thereby further reducing the delay that the terminal receives paging.

In some embodiments, before determining a scanning start point of each of the corresponding scanning areas on which the beam scanning is performed by the n beam scanning nodes respectively, the method can further include an additional step of: determining the number and locations of the terminals to be paged; selecting, based on the number of the terminals to be paged, wherein the n beam scanning nodes from the m beam scanning nodes set for the target cell by the base station. In such an embodiment this method can also include an optional step of dividing the target cell into the n scanning areas corresponding to the n beam scanning nodes respectively, based on the n beam scanning nodes and the locations of the terminals to be paged,.

In some embodiments, the determining a scanning start point of each of the corresponding scanning areas on which the beam scanning is performed by the n beam scanning nodes can respectively include a step of: determining delay capabilities of the terminals to be paged, wherein the delay capabilities are configured to indicate delays required by the terminals to be paged to receive the paging signal. In such an embodiment the method can also include a step of: determining the scanning start points of the n beam scanning nodes for performing beam scanning on the corresponding scanning areas, based on the delay capabilities of the terminals to be paged,.

In some embodiments, the step of determining the scanning start points of the n beam scanning nodes for performing beam scanning on the corresponding scanning areas based on the delay capabilities of the terminals to be paged, can also include the step of: determining whether the terminals to be paged include a low-delay terminal based on the delay capabilities of the terminals to be paged, wherein the low-delay terminal refers to a terminal that the delay required to receive the paging signal is less than a preset threshold. This embodiment can then include an additional steps of: determining a location of the low-delay terminal when the terminals to be paged include a low-delay terminal; and determining the scanning start point of a target beam scanning node for performing beam scanning on a target scanning area, based on the location of the low-delay terminal, wherein the target beam scanning node is a beam scanning node corresponding to the target scanning area, and the target scanning area is a scanning area in the n scanning areas where the low-delay terminal is currently located.

In some embodiments, when performing beam scanning on each of the corresponding scanning areas by the n beam scanning nodes respectively based on the paging signal, and the beam scanning start point and a preset scanning direction of each of the n beam scanning nodes, to the system can send the paging signal to the terminals in the corresponding scanning areas by beam scanning. In some embodiments when this step is performed this beam scanning step can further include the steps of: performing beam scanning on the target scanning area based on the paging signal, and the beam scanning start point and the preset scanning direction of the target beam scanning nod. When including these steps it allows the system to send the paging signal to the low-delay terminal by beam scanning. Further, in such embodiments the method can then include a step of: determining a preset scanning start point of the target beam scanning node after performing beam scanning on the target scanning area,. In some such embodiments the system can then be configured so as to continuously perform a beam scanning operation on the target scanning area based on the paging signal, the preset scanning start point, and the preset scanning direction. In this manner the system can then send the paging signal to alternative terminals from the low-delay terminal in the target scanning area by utilizing a beam scanning process.

In some embodiments, in yet additional alternative embodiments, the system, when determining a location of the low-delay terminal, can also include additional steps, which can include: determining the location of the low-delay terminal based on a location at which the low-delay terminal is connected to the base station by radio resource control, i.e. RRC, at a most recent time or scan before the current time or scan.

In some embodiments, the method can further include a step of: sending notification information to the terminals in the target cell, wherein the notification information includes time domain location information and frequency domain location information of the paging signal prior to performing beam scanning on each of the corresponding scanning areas by the n beam scanning nodes respectively based on the paging signal, and the beam scanning start point and a preset scanning direction of each of the n beam scanning nodes.

Figure 2A:
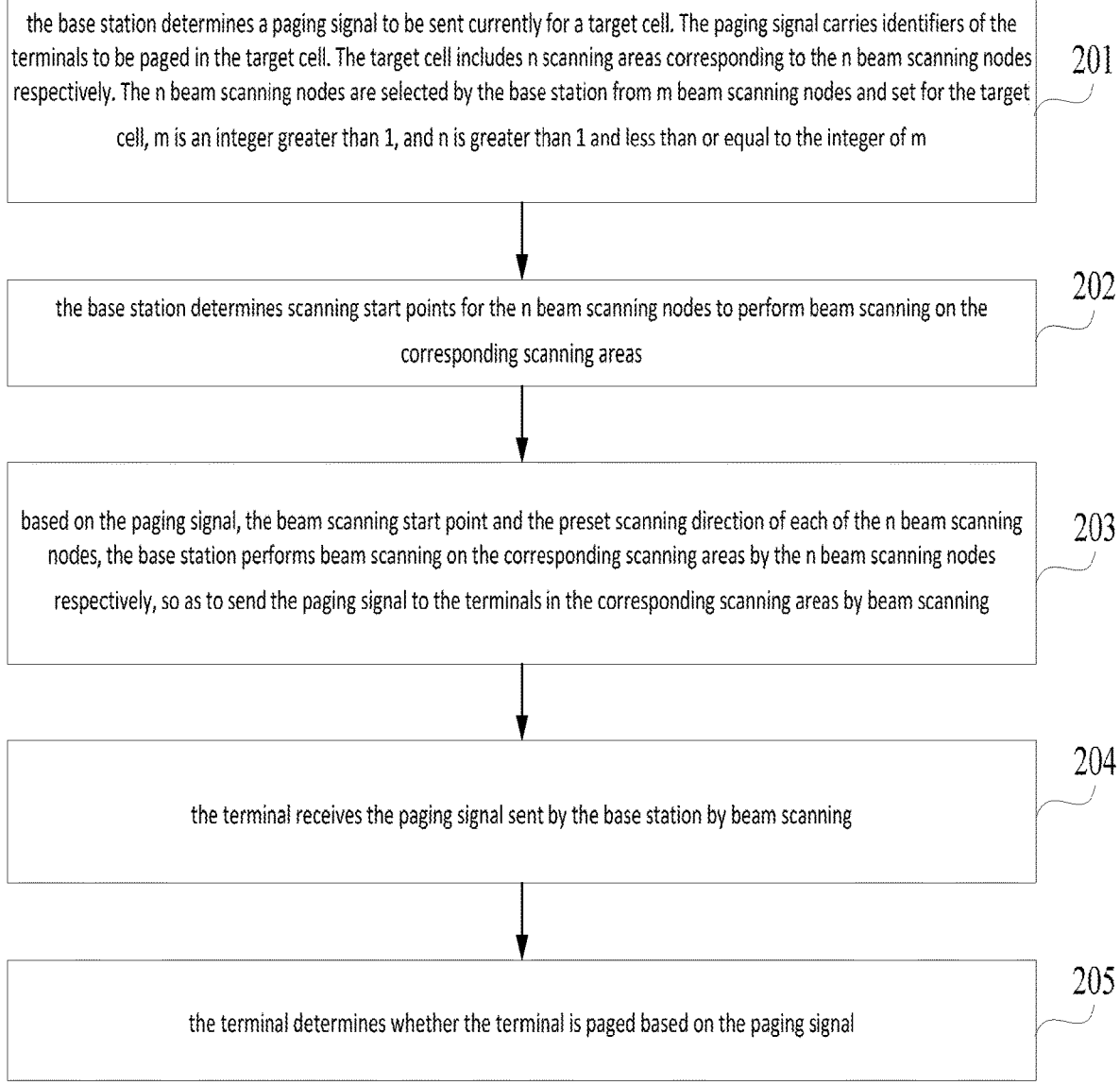
FIG. 2A illustrates a flowchart of a paging method according to another exemplary embodiment of the present disclosure as contemplated herein.

FIG. 2A illustrates a flowchart of a paging method according to various embodiments of the present disclosure,. As illustrated here, the main body of the interaction of the method can be implemented via a typical base station and one or more associated terminals.

Referring now specifically to FIG. 2A, the method may include the following steps:

Step 201, utilizing the base station, determine a paging signal to be sent currently for a target cell, wherein the paging signal carries identifiers of the terminals to be paged in the target cell. In such embodiments, the target cell can then include n scanning areas corresponding to the n beam scanning nodes respectively. The n beam scanning nodes are then selected by the base station from m beam scanning nodes and set for the target cell, wherein m is an integer greater than 1, and n is greater than 1 and less than or equal to the integer of m.

In this embodiment the target cell is a cell to which the paging signal is intended to be sent, wherein the target cell can be one of a plurality of cells managed by the base station. The paging signal carries the identifiers of the terminals to be paged in the target cell, and wherein the paging signal is configured to page the terminals to be paged. For example, in some instances the terminal to be paged can be notified that it is intended to receive a paging request, or the terminal to be paged can be notified to update system information, wherein the terminal to be paged can then be notified that it is intended to receive alarm information such as earthquakes warnings, tsunami warnings, or the like.

The base station can determine the paging signal to be sent currently for the target cell, according to a core network. Additionally the base station can also determine the paging signal to be sent currently for the target cell according to preset policy which is not limited by the examples of the disclosure. For example, a Mobility Management Entity, i.e. an MME, can send a paging message to the base station, and the paging message carries an identifier of the terminal to be paged. After receiving the paging message, the base station can interpret the paging message to determine whether the terminal to be paged currently is located in a cell managed by the base station, and in which cell. When it is determined that the terminal to be paged is in the target cell, the paging signal to be sent currently can be determined for the target cell based on the identifier of the terminal to be paged in the target cell.

In various alternative examples of the present disclosure, in order to improve the sending efficiency of the paging signal based on beam scanning, the base station can set m beam scanning nodes for the target cell, and divide the target cell into m scanning areas based on the m beam scanning nodes. The m scanning areas as illustrated herein can be provided in one-to-one correspondence with the m beam scanning nodes. In such instances, each beam scanning node can be configured to perform beam scanning on the corresponding scanning area so as to send the paging signal to the corresponding scanning area by beam scanning.

The above beam scanning node can be a Transmission Reception Point, i.e. a TRP, or the like.

It is assumed that the target cell is a circular area with the base station as a circle center, wherein then the target cell can be divided into m sectors with the base station as a circle center and having an equal central angle based on the m beam scanning nodes, so as to obtain m scanning areas each being equal.

Figure 2B:
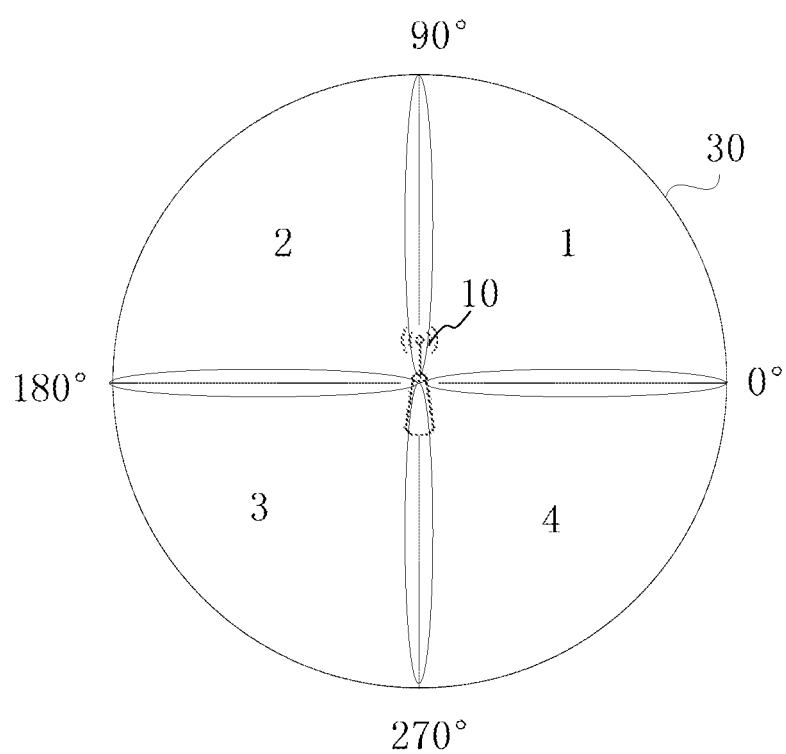
FIG. 2B illustrates a schematic diagram of dividing scanning areas of a cell according to an exemplary embodiment of the present disclosure as contemplated herein.

For example, referring to FIG. 2B, the base station 10 serves for a cell 30 with the base station 10 as a circle center. If the base station 10 sets four beam scanning nodes for the cell 30, the cell 30 can be equally divided into four scanning areas corresponding to the four beam scanning nodes respectively. As shown in FIG. 2B, the four scanning areas are respectively scanning areas 1 to 4. The scanning area 1 is a sector having a central angle between 0° and 90°. The scanning area 2 is a sector having a central angle between 90° and 180°. The scanning area 3 is a sector having a central angle between 180° and 270°. The scanning area 4 is a sector having a central angle between 270° and 0°.

Figure 2C:
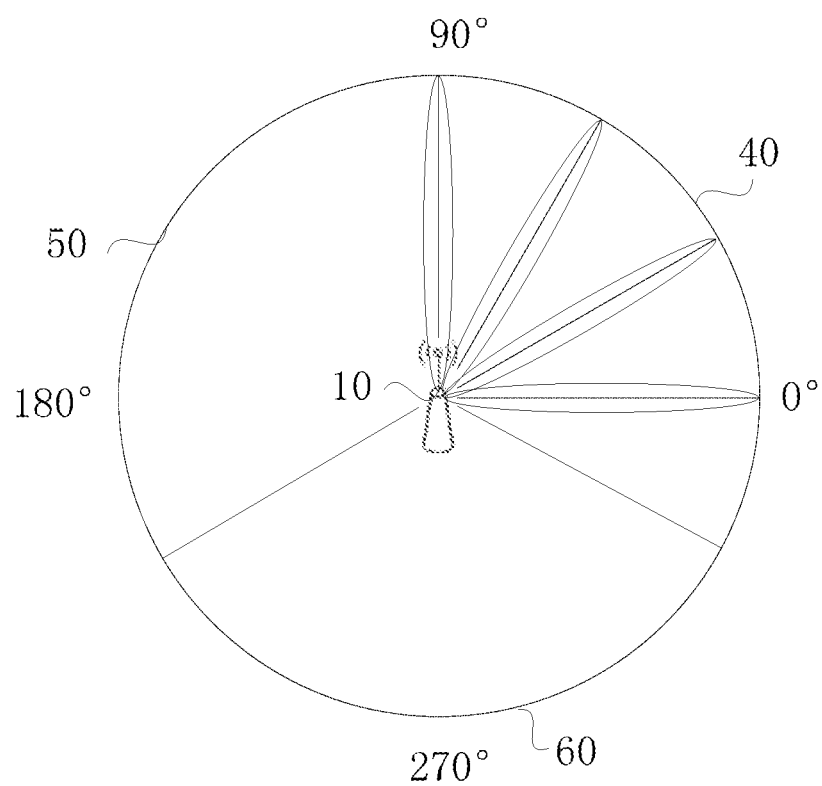
FIG. 2C illustrates a schematic diagram of dividing scanning areas of a cell according to another exemplary embodiment of the present disclosure as contemplated herein.

For another example, referring to FIG. 2C, the base station 10 can be configured such that the covered circular area is divided into three cells, namely, a cell 40, a cell 50, and a cell 60 respectively. It will then be appreciated that these three cells take the base station 10 as the circle center and all have the central angle of 120°.

If the cell 40 is the target cell, and the base station 10 sets four beam scanning nodes for the cell 40, then the cell 40 can be equally divided into four sectors as shown in FIG. 3C2, and the four sectors are the four scanning areas corresponding to the four beam scanning nodes respectively each having a central angle of 90°.

It should be noted that the examples of the present disclosure are only described by equally dividing the target cell into m scanning areas based on the m beam scanning nodes. In practical application, since the target cell can have an irregular area shape, the target cell cannot be equally divided when being divided into m scanning areas, and two adjacent scanning areas can have an overlap area, which is not limited by examples of the present disclosure.

After the paging signal to be sent is determined, the base station can select n beam scanning nodes from the m beam scanning nodes set for the target cell, and divide the target cell into n scanning areas corresponding to the n beam scanning nodes respectively, so as to perform beam scanning on the n scanning areas based on the n beam scanning nodes.

In one particular potential implementation, the base station can directly use the m beam scanning nodes set for the target cell as the n beam scanning nodes, and use the well-divided m scanning areas as the scanning areas corresponding to the n beam scanning nodes, that is, n is equal to m in such implementations.

In another potential implementation, the base station can determine the number and locations of the terminals to be paged. The base station can then be configured to select the n beam scanning nodes from the m beam scanning nodes set for the target cell based on the number of terminals to be paged. The target cell can in such instances be divided into the n scanning areas corresponding to the n beam scanning nodes respectively based on the n beam scanning nodes and the locations of the terminals to be paged.

In other words, the number of the beam scanning nodes to be activated are selected from the set m beam scanning nodes based on the number of the terminals to be paged. When the number of the terminals to be paged is relatively large, a correspondingly large number of beam scanning nodes can be selected to be activated. In contrast, when the number of the terminals to be paged is relatively small, a correspondingly lower number of beam scanning nodes to be activated can be selected. In this manner, the system thereby improves flexibility and saves resources of the base station. In such embodiments, the target cell can then be divided into n scanning areas according to the locations of the terminals to be paged. In some such embodiments the n beam scanning nodes can then be provided in one-to-one correspondence with the n scanning areas, wherein each beam scanning node is configured to perform beam scanning on a corresponding scanning area.

As illustrated in step 202, the base station can be configured so as to determine scanning start points for the n beam scanning nodes to perform beam scanning on the corresponding scanning areas.

In some embodiments, the step of determining the scanning start points for the n beam scanning nodes to perform beam scanning on the corresponding scanning areas includes but not limited to the following:

A first such embodiment can include additional steps of: determining preset scanning start points for the n beam scanning nodes to perform beam scanning on the corresponding scanning areas, and determining the corresponding preset scanning start points as the scanning start points for performing beam scanning on the corresponding scanning areas.

For example, referring to FIG. 2B, it is assumed that n is equal to m, and n is 4, and the beam scanning nodes 1 to 4 respectively correspond to the scanning areas 1 to 4. Exemplarily, the clockwise direction can be set to the preset scanning direction. In such embodiments, the 90° position in the drawing is set as the scanning start point of the beam scanning node 1, the 180° position in the drawing is set as the scanning start point of the beam scanning node 2, the 270° position in the drawing is set as the scanning start point of the beam scanning node 3, and the 0° position in the drawing is set as the scanning start point of the beam scanning node 4.

A second such embodiment can include the additional steps of: determining delay capabilities of the terminals to be paged, wherein the delay capabilities are configured to indicate delays required by the terminals to be paged to receive the paging signal; and determining the scanning start points for the n beam scanning nodes to perform beam scanning on the corresponding scanning areas based on the delay capabilities of the terminals to be paged.

The delay required to receive the paging signal in such an instance can refer to the time between the moment when the base station starts to send the paging signal and the moment when the terminal receives the paging signal. When the required delay is relatively short, it is indicated that the terminal needs to receive the paging signal quickly. In contrast, when the required delay is relatively long, it is indicated that the terminal can delay appropriately to receive the paging signal.

Alternatively, the delay capability can also be used to indicate the delay required by the terminal to be paged to receive all the signals, which is not limited by the present examples of the present disclosure.

Further, the delay capability can also be configured to indicate a delay type of the terminal. The delay type can include a low delay type and a normal delay type. The low delay type can be configured to indicate that the delay required by the terminal to receive the paging signal is less than the preset threshold. In other words, the terminal is relatively sensitive to the delay, and needs to receive the associated paging signal quickly. The normal delay type can instead be configured to indicate that the delay required by the terminal to receive the paging signal is greater than or equal to the preset threshold. In other words, the terminal is relatively insensitive to delay, and can appropriately delay to receive the associated paging signal.

The preset threshold can be set by a core network, or set by the base station, or negotiated by at least two of the following: the core network, the base station, and the terminal, which options are for exemplary purposes only and not intended to be limiting of the disclosure as a whole.

In yet additional aspects of the present disclosure, the process of determining the scanning start points for the n beam scanning nodes to perform beam scanning on the corresponding scanning areas can include the following steps:

A first step can include: determining whether the terminal to be paged include a low-delay terminal based on the delay capabilities of the terminals to be paged, wherein the low-delay terminal refers to the terminal that the delay required to receive the paging signal is less than a preset threshold.

In one potential embodiment, the terminal can determine a delay required to receive the paging signal of each terminal in the terminals to be paged according to delay capabilities of the terminals to be paged. Then the terminal can determine whether there is a terminal that the delay required to receive the paging signal is less than the preset threshold in the terminals to be paged according to the delay requirement for receiving the paging signal of each terminal. If yes, it is determined that the terminals to be paged include a low-delay terminal.

In another potential embodiment, the terminal can determine the delay type of each terminal in the terminals to be paged, according to the delay capabilities of the terminals to be paged, and then determine whether there is a terminal of which the delay type is the low delay type in the terminals to be paged according to the delay type of each terminal\. If yes, it is determined that the terminals to be paged include a low-delay terminal.

A second step can include: determining the location of the low-delay terminal when the terminals to be paged include a low-delay terminal.

The base station can determine the location of the low-delay terminal based on the location where the low-delay terminal is connected to the base station by Radio Resource Control, i.e. RRC, at the last scan prior to the current scan. In such instances, the base station can also determine the location of the low-delay terminal by other manners, which is not limited by the examples of the disclosure.

A third step can include: determining the scanning start point for a target beam scanning node to perform beam scanning on a target scanning area based on the location of the low-delay terminal. In such instances the target beam scanning node can be provided as a beam scanning node corresponding to the target scanning area. The target scanning area can then be a scanning area where the low-delay terminal is currently located, as selected from the plurality of the n scanning areas.

In other words, the base station can determine the scanning start point of the target beam scanning node based on the location of the low-delay terminal for the target scanning area with a low-delay terminal. Alternatively, the base station can determine the preset scanning start point of the beam scanning node corresponding to the scanning area as the scanning start point of the beam scanning node corresponding to such scanning area for the scanning area without a low-delay terminal.

It should be noted that, the purpose of determining the scanning start point for the target beam scanning node to perform beam scanning on the target scanning area based on the location of the low-delay terminal is intended to ensure that when the target beam scanning node starts the beam scanning having the determined scanning start point, the location area where the low-delay terminal is located can be scanned before other location areas. Therefore, the paging signal can be preferably sent to the low-delay terminal by beam scanning, so that the low-delay terminal can quickly receive the paging signal, thereby meeting the low delay requirement of the low-delay terminal. In this way, the corresponding scanning area can be scanned in a targeted manner according to the delay capability of the terminal, thereby improving the accuracy and scanning efficiency of the beam scanning.

As illustrated in step 203, the beam scanning start point and the preset scanning direction of each of the n beam scanning nodes can be based on the paging signal. In such embodiments, the base station can perform beam scanning on the corresponding scanning areas by the n beam scanning nodes respectively, so as to send the paging signal to the terminals in the corresponding scanning areas by beam scanning.

Additionally, when the beam scanning start point and a preset scanning direction of each of the n beam scanning nodes is based on the paging signal, the process of performing beam scanning on the corresponding scanning areas by the n beam scanning nodes respectively then allows the system to send the paging signal to the terminals in the corresponding scanning areas by beam scanning.

The steps of sending the paging signal to the terminals in the corresponding scanning areas can include the following steps:

a first step of: beam scanning is performed on the target scanning area based on the paging signal, the beam scanning start point, and the preset scanning direction of the target beam scanning node for the target beam scanning node, so as to send the paging signal to the low-delay terminal by beam scanning.

In other words, the target beam scanning node can perform beam scanning according to the preset scanning direction with the beam scanning start point of the target beam scanning node as the start point, in this manner the location of the low-delay terminal is preferably scanned.

In a second step: the preset scanning start point of the target beam scanning node is determined after performing beam scanning on the target scanning area. In other words, the target beam scanning node can determine the preset scanning start point of the target beam scanning node after scanning the location area where the low-delay terminal is located.

The target beam scanning node can then determine the preset scanning start point of the target beam scanning node after performing beam scanning on the target scanning area for a preset time period based on the paging signal, the beam scanning start point, and the preset scanning direction of the target beam scanning node. Additionally, the preset scanning start point of the target beam scanning node can also be determined when the scanning is determined to a preset scanning end point that the target beam scanning node performs beam scanning on the target scanning area.

In some additional embodiments a third step can be included in which the beam scanning can be continuously performed on the target scanning area based on the paging signal, the preset scanning start point, and the preset scanning direction. In this manner the paging signal can be sent to other terminals other than the low-delay terminal in the target scanning area by beam scanning.

After the location area where the low-delay terminal is located is scanned, in order to avoid missing other terminals, the target beam scanning node can continue to perform beam scanning on the target scanning area according to the preset scanning direction with the preset scanning start point as the start point, so as to scan other terminals than the low-delay terminal in the target scanning area.

Figure 2D:
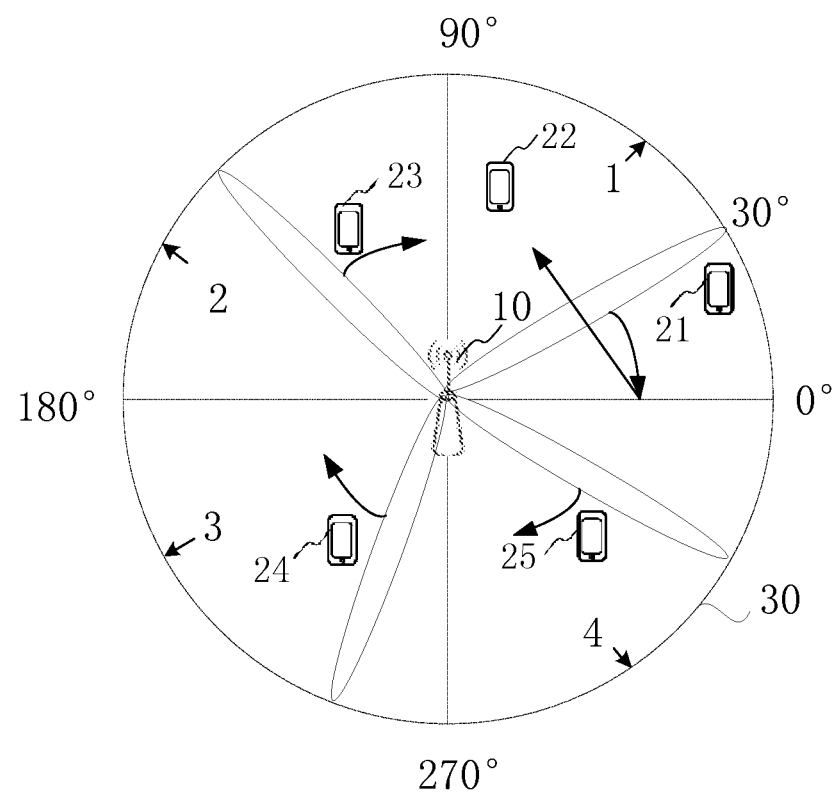
FIG. 2D is a schematic diagram of performing beam scanning on a cell according to yet another an exemplary embodiment of the present disclosure as contemplated herein.

For example, based on the partition of FIG. 2B, referring to FIG. 2D, when the scanning area 1 includes the terminal 21 and the terminal 22, wherein it will be understood that the terminal 21 is illustrated as a low-delay terminal, and the wherein the terminal 22 is illustrated as a normal delay terminal. In such an instance the scanning area 1 corresponds to the beam scanning node 1 in the base station 10. The preset scanning start point of the beam scanning node 1 is the 90° position in the drawing, wherein the preset scanning end point is the 0° position in the drawing, and the preset scanning direction is the clockwise direction. Then in the beam scanning process, the base station 10 can determine that the scanning start point of the beam scanning node 1 is the 30° position in the drawing based on the position of the terminal 21, and perform a first beam scanning operation on the scanning area 1 in the clockwise direction with the 30° position in the drawing as the start point. After the first beam scanning is completed to the 0° position in the drawing, the beam scanning is performed in the clockwise direction with the 90° position in the drawing as the start point, and the scanning is not stopped until scanning to the 0° position in the drawing, thereby completing one beam scanning cycle. For the low-delay terminal 23 in the scanning area 2, the low-delay terminal 24 in the is associated with scanning area 3, and the low-delay terminal 25 in the scanning area 4, the beam scanning can be performed in the same manner, which can be performed in a similar process to the first beam scanning operation process described above, and which is not repeated due to the redundant and repetitive nature of each scanning operation being substantially identical.

Further, for the scanning area without to low-delay terminal, the base station can further buffer the paging signal without immediately performing beam scanning on the scanning area. For example, the paging signal can be buffered by one beam scanning period, and the beam scanning can then instead be performed on the scanning area based on the paging signal in the next beam scanning period, thereby saving the beam scanning resources of the base station.

Further, when the beam scanning is performed on the corresponding scanning area by the beam scanning node, the base station can further comprehensively determine the scanning start point of the beam scanning node based on the delay capabilities of the terminals to be paged, the channel reciprocity, the Discontinuous Reception, i.e. DRX, period of the terminals to be paged, and the like.

Further, when there is a plurality of low-delay terminals in a given target scanning area, the base station can further determine the scanning start point of the target beam scanning node by the locations of the plurality of low-delay terminals. In this manner, when the target beam scanning node performs beam scanning based on the scanning start point and the preset scanning direction, the area where the plurality of low-delay terminals is located can be preferably scanned as opposed to the delay terminals.

In one potential scenario, the system can be configured such that a plurality of scanning start points can be determined based on the locations of the plurality of low-delay terminals. In such instances, a first scanning start point, which can be the scanning start point being closest to the preset scanning start point according to the preset scanning direction, can be selected from the plurality of scanning start points. The beam scanning can then be performed on the target scanning area based on the paging signal, the first scanning start point, and the preset scanning direction. After a preset time period for performing the beam scanning on the target scanning area, a second beam scanning start point, which is closest to the first scanning start point according to the preset scanning direction, can be selected and a beam scanning is performed on a target scanning area based on the paging signal, the second beam scanning start point, and the preset scanning direction. When the beam scanning is performed for all associated scanning start points in the plurality of scanning start points, the preset scanning start point of the target beam scanning node can then be determined. Additionally, in some such embodiments, the beam scanning can then be continuously performed on the target scanning area based on the paging signal, the preset scanning start point, and the preset scanning direction.

In other words, the target beam scanning node can perform separate fast scanning on the plurality of low-delay terminals respectively, and then perform complete scanning on the scanning area according to the preset scanning start point.

It should then be noted that, in practical applications, the time domain unit of the beam scanning will be very small. Therefore, in a single beam scanning period, there is at most two low-delay terminals to be paged in one scanning area, and thus only the scenario that two low-delay terminals are located in one target scanning area needs to be considered.

Further, before the paging signal is sent to the terminals in the corresponding scanning areas by beam scanning, the frequency domain position and the time domain position of the paging signal can be predefined. In this manner, the terminal can receive the paging signal according to the predefined frequency domain location and time domain location. For example, a paging bandwidth for carrying the paging signal can be predefined. Exemplarily, the paging bandwidth can be set to 15K, 30K, etc., which is not limited by examples of the present disclosure, but only mentioned for purposes of illustration.

Further, the frequency domain location of the paging signal can be separately sent for each of the n beam scanning nodes, so that the n beam scanning nodes can send the paging signal in parallel on different frequency domain locations in a same time domain location. For example, the predefined paging bandwidth can include n sub-bandwidths, and each sub-bandwidth can independently carry a paging signal. Then the n beam scanning nodes can simultaneously send the paging signal by the n sub-bandwidths when sending the paging signal by beam scanning.

Figure 2E:
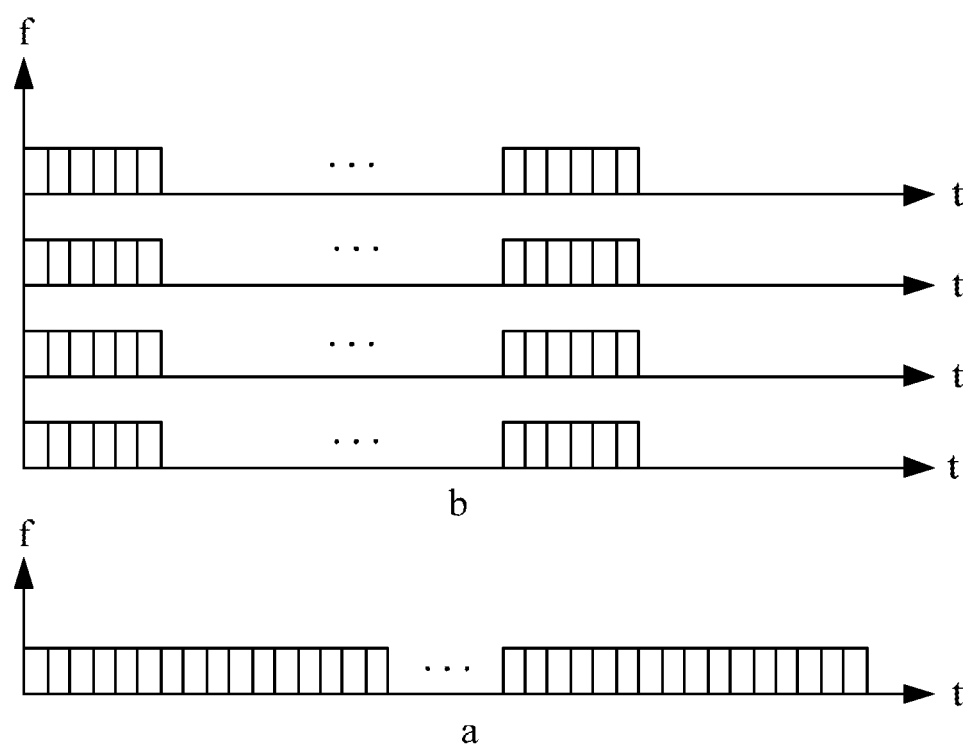
FIG. 2E illustrates a schematic diagram of two exemplary scan times wherein a illustrates performing beam scanning on a cell by one beam scanning node according to an example and wherein b illustrates performing beam scanning areas of a cell by four beam scanning nodes respectively according to an alternative exemplary embodiment of the present disclosure as contemplated herein.

For example, referring to FIG. 2E, the horizontal coordinate t in FIG. 2E represents the time domain, the longitudinal coordinate f represents the frequency domain, and each square represents a unit of the paging signal in the time domain and the frequency domain. Particularly, as shown FIG. 2E, n represents a schematic diagram of scan time of performing beam scanning on the cell by a single beam scanning node according to an example. In contrast, as also illustrated in FIG. 2E, b represents an alternative schematic diagram of scan time of performing beam scanning on corresponding scanning areas of the cell by four beam scanning nodes respectively according to an alternative example.

As can be seen from a of FIG. 2E, when beam scanning is performed on the cell by one beam scanning node, 16 associated time domain units are required to scan the entire cell. In contrast, as can be seen from b of FIG. 2E, the four beam scanning nodes can simultaneously perform beam scanning by four sub-bandwidths respectively on the corresponding scanning areas of the cell. It is assumed that fast scanning on the low-delay terminals in each corresponding scanning area needs two time domain units, then once complete scanning on each scanning area needs four time domain units. As such it will be appreciated that each beam scanning node needs only six time domain units to complete scanning on the corresponding scanning area. When four beam scanning nodes perform scanning simultaneously, only six time domain units are required to complete the scanning of the entire cell. Therefore, as illustrated by comparing b with a in FIG. 2E, it will be appreciated that the solution of b of FIG. 2E saves 10 time domain units, that is, ⅝ of the duration are saved, thereby greatly improving the efficiency of beam scanning and reducing the delay of the terminal.

Further, before the paging signal is sent to the terminals in the corresponding scanning areas by beam scanning, a notification message can be sent to the terminals in the target cell. The notification message can in some instances include the time domain location information and the frequency domain location information of the paging signal. In this manner, the terminals in the target cell can receive the paging signal based on the time domain location information and the frequency domain location information. Further, the notification message can further include the number of the beam scanning nodes of the base station set for the target cell by the base station.

The base station can then send the notification message to the terminals in the target cell by signaling. This notification message can include system information, and can also be transmitted by other means, wherein the methods discussed here are made by way of example only and are not intended to be limited thereby, and alternative methods and potential information contained therein will be appreciated by those having skill in the art and as such are also contemplated herein.

In some embodiments, the frequency domain location information can include the paging bandwidth information, so that the terminals can receive the paging signal on the paging bandwidth. Further, the frequency domain location information can further include the information of the n sub-bandwidths. In this manner, the terminals can simultaneously receive the paging information on the n sub-bandwidths of the paging bandwidth. Further, the base station can send different notification messages to different scanning areas, and the notification message sent to the target scanning area carries the information of the target sub-bandwidth. The information of the target sub-bandwidth can then be configured to indicate the sub-bandwidth in which the paging signal sent to the target scanning area is located. In this manner, the terminal can directly receive the paging signal on the target sub-bandwidth of the paging bandwidth.

In step 204, as illustrated herein, the terminal can be configured to receive the paging signal sent by the base station by beam scanning.

In other words, the terminal in the target cell can be configured to receive the paging signal sent by the corresponding beam scanning node to perform beam scanning on the scanning area. Moreover, when the terminal is the paged low-delay terminal, the terminal can also preferably receive the paging signal.

In step 205, as illustrated herein, the terminal can be configured to determine whether the terminal is paged based on the paging signal.

The terminal can compare the identifier in local end with the identifiers of the terminals to be paged in the paging signal, and determine whether the terminal is paged by the comparing result. When the comparing result is positive, that is, when the identifiers of the terminals to be paged carried in the paging signal includes the identifier of the terminal, it can be determined that the terminal is paged, thereby initiating a paging response.

Further, before receiving the paging signal, the terminal can further receive notification information sent by the base station. In some such instances, the notification information can include time domain location information and frequency domain location information of the paging signal. Then the terminal can receive the paging signal based on the time domain location information and the frequency domain location information, which is set for the current cell by the base station, by beam scanning performed by the n beam scanning nodes on the corresponding scanning areas respectively.

It should be noted that in order to save power consumption, the terminal is generally configured with a DRX cycle. In such instances, the DRX cycle can include an associated activation period and an associated sleep period. During the sleep period of the DRX cycle, the terminal can be configured to enter sleeping state in which state the terminal can be configured to stop monitoring the paging signal. In such instances, it is only necessary to monitor the paging signal during the activation period. Moreover, when the time required for one beam scanning node to perform beam scanning on the cell is T, the terminal in the cell will generally need to maintain the activation time in the DRX cycle to be time T and above. This allows the system to ensure that the paging signal can be completely received. For the method provided by the present disclosure, when the time of beam scanning is reduced to 1/T, the activation time of the terminal in the DRX cycle can be correspondingly reduced, thereby prolonging the sleep time of the terminal and reducing the power consumption of the terminal.

Further, after receiving the paging signal, the terminal can further adjust the activation time and sleep time of the terminal in the DRX cycle based on the received paging signal. For example, the terminal can stop the activation and enter the sleep immediately after receiving the paging signal, so that the sleep time of the terminal can be further prolonged, and the power consumption of the terminal is reduced.

In the examples of the present disclosure, the base station can determine the paging signal to be sent currently for the target cell, and perform beam scanning on the corresponding scanning areas by the n beam scanning nodes respectively based on the paging signal, the beam scanning start point and the preset scanning direction of each of the n beam scanning nodes. In this manner, the system is capable of sending the paging signal to the terminals in the corresponding scanning areas, particularly in situations wherein n is greater than 1. In some such instances, the beam scanning can be performed on the corresponding scanning area of the cell by the n scan scanning nodes respectively. In other words, parallel scanning can be performed by the n beam scanning nodes. Therefore, the time required for performing the beam scanning of the cell cam be greatly reduced, and the associated efficiency of sending the paging signal to the terminal in the cell based on beam scanning is improved, thereby reducing the delay that the terminal receives the paging.

Figure 3A:
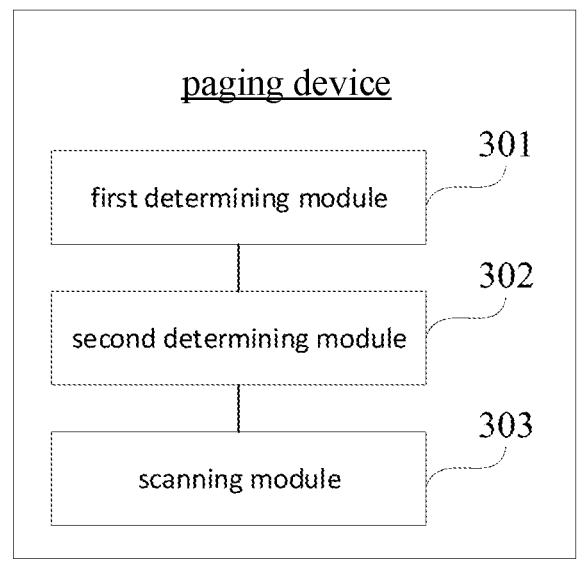
FIG. 3A illustrates a block diagram of a paging device according to a first exemplary embodiments of the present disclosure as contemplated herein.

FIG. 3A illustrates a block diagram of a paging device according to one example in accordance with various aspects of the present disclosure. The paging device can include a base station, wherein in some such instances the base station can be provided as a 5G wireless communication system. The paging device can then include a first determining module 301, wherein the first determining module 301 can be configured to determine a paging signal to be sent currently for a target cell. In some such instances, the paging signal can be configured to carry identifiers of terminals to be paged in the target cell. In this illustrated embodiment the target cell can include n scanning areas corresponding to n beam scanning nodes respectively.

Further, the n beam scanning nodes in this embodiment can be selected by a base station from m beam scanning nodes set for the target cell, the target cell is a cell to which the paging signal is to be sent, as selected from a plurality of cells managed by the base station. As illustrated here, m is an integer greater than 1, and n is an integer greater than 1 and less than or equal to m.

The paging device can then include a second determining module 302, wherein the second determining module can then be configured to determine a scanning start point of each of the corresponding scanning areas on which the beam scanning is performed by the n beam scanning nodes respectively. The paging device can then include an associated scanning module 303, wherein the scanning module can be configured to perform beam scanning on each of the corresponding scanning areas by the n beam scanning nodes respectively based on the paging signal, and the beam scanning start point, and a preset scanning direction of each of the n beam scanning nodes so as to send the paging signal to the terminals in the corresponding scanning areas by beam scanning.

In some embodiments in an alternative embodiment, the second determining module 302 can include: a first determining sub-module, wherein the first determining sub-module is capable of being configured to determine delay capabilities of the terminals to be paged. In some such embodiments, the delay capabilities can be configured to indicate delays required by the terminals to be paged to receive the paging signal. In yet additional such embodiments, the second determining module can include a second determining sub-module, wherein the second determining sub-module can be configured to determine the a scanning start point of each of the n beam scanning nodes for performing beam scanning on the corresponding scanning areas based on the delay capabilities of the terminals to be paged.

In some embodiments, in some embodiments including a second determining module 302, the second determining module can include a judging sub-module. In such embodiments, the judging sub-module can be configured to determine whether the terminals to be paged include a low-delay terminal based on the delay capabilities of the terminals to be paged. In some such embodiments a low-delay terminal may be present, wherein low-delay terminal refers to a terminal that the delay required to receive the paging signal is less than a preset threshold.

In yet additional embodiments, the paging device can include yet another third determining sub-module, wherein the third determining sub-module can be configured to determine a location of the low-delay terminal when the terminals to be paged include a low-delay terminal.

In yet additional embodiments, the paging device can include yet another fourth determining sub-module, wherein the fourth determining sub-module can be configured to determine the scanning start point of a target beam scanning node for performing beam scanning on a target scanning area based on the location of the low-delay terminal, wherein the target beam scanning node can be a beam scanning node corresponding to the target scanning area, and the target scanning area can be a scanning area in the n scanning areas where the low-delay terminal is currently located.

In some embodiments, an alternative scanning module 303 is contemplated herein which can include the following components: a first scanning sub-module, wherein the first scanning sub-module can be configured to perform beam scanning on the target scanning area based on the paging signal, the beam scanning start point, and the preset scanning direction of the target beam scanning node, in this manner the scanning module can be utilized so as to send the paging signal to the low-delay terminal by beam scanning.

In yet additional embodiments the paging device can further include a fifth determining sub-module, wherein the fifth determining sub-module can be configured to determine a preset scanning start point of the target beam scanning node after a beam scanning operation has been performed on the target scanning area.

In yet additional embodiments the paging device can include a second scanning sub-module, wherein the second scanning sub-module can then be configured to continuously perform beam scanning on the target scanning area based on the paging signal, the preset scanning start point, and the preset scanning direction. In this manner the second scanning sub-module can be utilized so as to send the paging signal to other terminals than the low-delay terminal in the target scanning area by beam scanning.

In some alternative embodiments, the third determining sub-module can be configured to determine the location of the low-delay terminal based on a location at which the low-delay terminal is connected to the base station by radio resource control, i.e. RRC, at the last time before the current time.

Figure 3B:
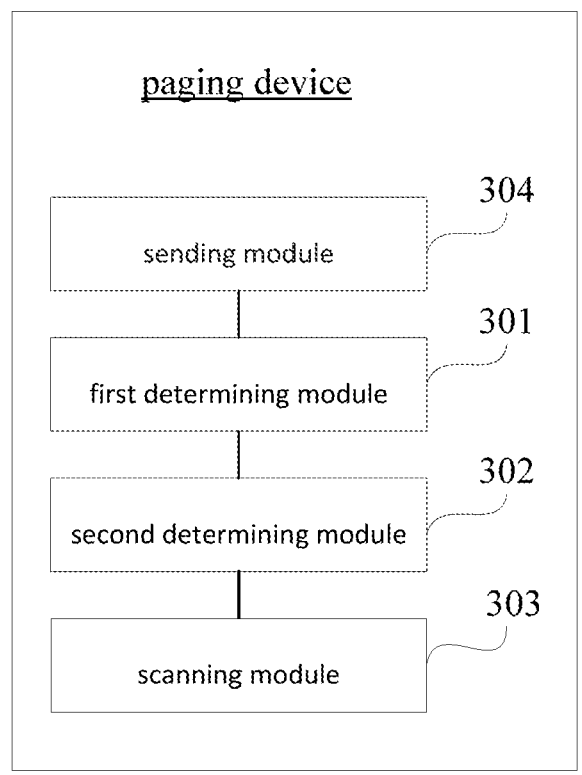
FIG. 3B illustrates a block diagram of a paging device according to another exemplary embodiment of the present disclosure as contemplated herein.

In some embodiments, referring to FIG. 3B, the paging device can in some instances further include: a sending module 304, wherein the sending module can then be configured to send notification information to the terminals in the target cell. In such instances the notification information can include time domain location information and frequency domain location information of the paging signal.

In yet additional examples of the present disclosure, a particular paging signal which is intended to be sent for the target cell can be determined, and based on the paging signal, the beam scanning start point, and the preset scanning direction of each of the n beam scanning nodes, the beam scanning can be performed on the corresponding scanning areas by the n beam scanning nodes respectively, so as to send the particular paging signal to the terminals in the corresponding scanning areas. The beam scanning is then performed on the corresponding scanning areas of the cell by the n beam scanning nodes respectively, wherein and n is greater than 1. In other words, parallel scanning can be performed by the n beam scanning nodes. As a result, the time required for performing the beam scanning of the cell can be greatly reduced, and the efficiency of sending the paging signal to the terminal in the cell based on the beam scanning is improved, thereby further reducing the delay that the terminal receives paging.

Figure 4:
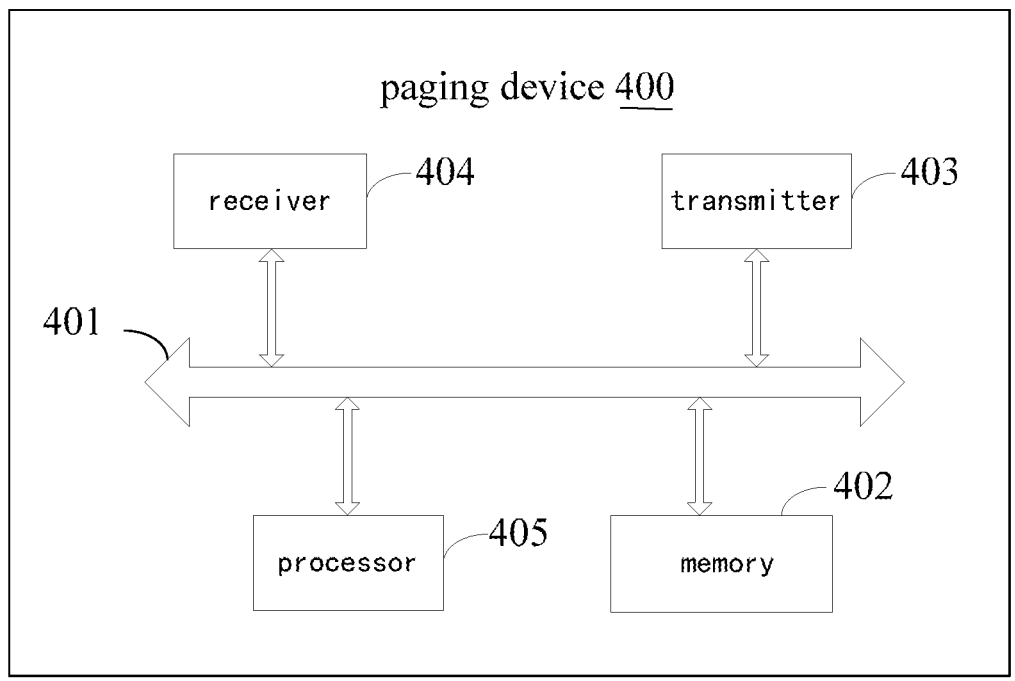
FIG. 4 illustrates a schematic diagram of a hardware structure of an exemplary paging device or system which is capable of performing various methods or tasks in accordance with various exemplary embodiments of the present disclosure as contemplated herein.

FIG. 4 is a schematic diagram of a hardware structure of a paging device 400 according to examples. As illustrated here, the paging device can be provided as a base station, such as a base station in a 5G wireless communication system. Referring to FIG. 4, the paging device 400 can include a communication bus 401, a memory 402, a transmitter 403, a receiver 404, and a processor 405, and the memory 402, wherein the transmitter 403, the receiver 404, and the processor 405 can communicate via the communication bus 401.

The transmitter 403 and the receiver 404 can then be configured to communicate with other devices. For example, the device 400 can send a notification message to the terminal by the transmitter 403 or send a paging signal to the terminal based on beam scanning, etc., or the 404 receives the management information sent by a core network.

The memory 402 as illustrated here can be configured to store a program or one or more computer implemented instructions configured to instruct the processor 405 to perform a variety of tasks. The processor 405 can then be configured to call the program stored in the memory 402 in order to implement the above paging method which can be contained within the program.

It should be noted that the above processor 405 can be an integrated circuit chip with signal processing capability. In the implementation process, the above steps can be completed by an integrated logic circuit of hardware in the processor or instructions in the form of software. These instructions can be implemented and controlled by the processor through cooperation. The above processor can also be a universal processor, a digital signal processor, i.e. DSP, or other programmable logic devices, discrete hardware components, etc.

The above universal processor can be a microprocessor, or can be any conventional processor, decoder, etc. The steps of the method disclosed in combination with the examples of the present disclosure can be directly implemented by a hardware processor, or can be implemented by the combination of hardware and software modules in the processor. The software module can be located in a random-access memory, a non-transitory computer-readable medium, a flash memory, a read only memory, a programmable read only memory or an electrically erasable programmable memory, a register, and other conventional storage mediums.

In addition, the transmitter 403 and the receiver 404 can be two separate pieces of hardware or integrated into the device 400 as a whole. For example, the transmitter 403 and the receiver 404 can be integrated into one transceiver.

Additionally, the device 400 can also include a communication interface for supporting communication of the device 400 with other devices. The communication bus 401 also includes a power bus, a control bus, and a status signal bus in addition to the data bus. However, for clarity of description, various buses are labeled as the communication bus 401 in 4.

In an example, there is also provided a non-transitory computer readable storage medium including instructions. When the instructions in the storage medium are executed by the processor of the device 400, the device 400 is enabled to perform the paging method as described above.

The foregoing has provided a detailed description a paging system and associated methods according to some embodiments of the present disclosure. Specific examples are used herein to describe the principles and implementations of some embodiments. The description is only used to help understanding some of the possible methods and concepts. Meanwhile, those of ordinary skill in the art can change the specific implementation manners and the application scope according to the concepts of the present disclosure. The contents of this specification therefore should not be construed as limiting the disclosure.

Additionally, each of the above optional technical solutions are included for the purposes of illustration of various concepts and form optional examples only, wherein each embodiment as discussed herein can include particular elements when referring to a particular embodiment, however, such combinations of elements are made for exemplary purposes only, wherein each feature or element of the present disclosure can be utilized in any combination as will be deemed appropriate by those having skill in the art.

In addition, those of ordinary skill in the art will also understand that the embodiments described in the specification are just some of the embodiments, and the involved actions and portions are not necessarily all required to realize the functions of the various embodiments.

Various embodiments in this specification have been described in a progressive manner, where descriptions of some embodiments focus on the differences from other embodiments, and same or similar parts among the different embodiments are sometimes described together in only one embodiment.

It should also be noted that in the present disclosure, relational terms such as first and second, etc., are only used to distinguish one entity or operation from another entity or operation, and do not necessarily require or imply these entities having such an order or sequence. It does not necessarily require or imply that any such actual relationship or order exists between these entities or operations.

Moreover, the terms "include," "including," or any other variations thereof are intended to cover a non-exclusive inclusion such that a process, method, article, or apparatus that comprises a list of elements including not only those elements but also those that are not explicitly listed, or other elements that are inherent to such processes, methods, goods, or equipment.

In the case of no more limitation, the element defined by the sentence "includes a . . . " does not exclude the existence of another identical element in the process, the method, the commodity, or the device including the element.

In the descriptions, with respect to device(s), step(s), etc., in some occurrences singular forms are used, and in some other occurrences plural forms are used in the descriptions of various embodiments. It should be noted, however, that the single or plural forms are not limiting but rather are for illustrative purposes. Unless it is expressly stated that a single device, or step, etc. is employed, or it is expressly stated that a plurality of devices, or steps, etc. are employed, the device(s), step(s), etc. can be singular, or plural.

Based on various embodiments of the present disclosure, the disclosed apparatuses, devices, and methods can be implemented in other manners. For example, the abovementioned systems are only of illustrative purposes, and other types of systems and devices may be suitable for employing the methods disclosed herein.

Dividing the system or device into different "portions", "regions", "or "components" merely reflect various logical functions according to some embodiments, and actual implementations can have other divisions of "portions," "regions," or "components" realizing similar functions as described above, with or without such divisions. For example, multiple portions, regions, or components can be combined or can be integrated into another system. In addition, some features can be omitted, and some steps in the methods can be skipped.

Those of ordinary skill in the art will appreciate that the portions, or components, etc. in the devices provided by various embodiments described above can be configured in one or more devices capable of utilizing the components as described above. They can also be located in one or multiple devices that is (are) different from the example embodiments described above or illustrated in the accompanying drawings. For example, the circuits, portions, or components, etc. in various embodiments described above can be integrated into one module or divided into several sub-modules.

The order of the various embodiments described above are only for the purpose of illustration, and do not represent preference of embodiments.

Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation to encompass such modifications and equivalent structures. The technical solution provided by the examples of the present disclosure has the following beneficial effects.

In examples of the present disclosure, the current paging signal, corresponds to the target cell, to be sent can be determined. The beam scanning is performed, based on the paging signal, the beam scanning start point of each of the n beam scanning nodes and the preset scanning direction, on the corresponding scanning areas by the n beam scanning nodes respectively, so as to send the paging signal to the terminals in the corresponding scanning areas, and n is greater than 1. Beam scanning is performed on the corresponding scanning areas of the cell by the n beam scanning nodes respectively, that is, parallel scanning can be performed by the n beam scanning nodes. Therefore, the time required for performing beam scanning of the cell is greatly saved, and the efficiency of sending the paging signal to the terminal in the cell based on beam scanning is improved, thereby further reducing the delay that the terminal receives paging.

The terminology used herein is for the purpose of describing particular examples only and is not intended to be limiting of examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof It should also be noted that in some alternative implementations, the functions/acts noted may occur out of the order noted in the figures. For example, two functions or acts shown in succession may in fact be executed concurrently or may sometimes be executed in the reverse order, depending upon the functionality/acts involved.

The invention claimed is:

1. A paging method, comprising:
   determining a paging signal to be sent currently for a target cell, wherein the paging signal carries identifiers of terminals to be paged in the target cell, the target cell comprises n scanning areas corresponding to n beam scanning nodes respectively, the n beam scanning nodes are selected by a base station from m beam scanning nodes set for the target cell, the target cell is a cell, to which the paging signal is to be sent, of at least one cell managed by the base station, m is an integer greater than 1, and n is an integer greater than 1 and less than or equal to m;
   determining a scanning start point of each of the corresponding scanning areas on which the beam scanning is performed by the n beam scanning nodes respectively; and
   performing beam scanning on the corresponding scanning areas by the n beam scanning nodes respectively so as to send the paging signal to the terminals in the corresponding scanning areas based on the paging signal, and a beam scanning start point and a preset scanning direction of each of the n beam scanning nodes.

2. The method according to claim 1, wherein prior to the performing beam scanning each of the scanning start points of each of the corresponding scanning areas on which the beam scanning is performed by the n beam scanning nodes respectively, the following steps are performed:
   determining the number and locations of a plurality of terminals to be paged;
   selecting the n beam scanning nodes from the m beam scanning nodes set by the base station for the target cell, based on the number of the terminals to be paged; and
   dividing the target cell into the n scanning areas corresponding to the n beam scanning nodes respectively based on the n beam scanning nodes and the locations of the terminals to be paged.

3. The method according to claim 1, wherein the determining a scanning start point of each of the corresponding scanning areas on which the beam scanning is performed by the n beam scanning nodes respectively, further comprises:
   determining delay capabilities of each the terminals to be paged, wherein each the delay capabilities are configured to indicate delays required by the terminals to be paged to receive the paging signal; and
   determining the scanning start points of the n beam scanning nodes for performing beam scanning on the corresponding scanning areas based on the delay capabilities of the terminals to be paged.

4. The method according to claim 3, wherein the determining the scanning start points of the n beam scanning nodes for performing beam scanning on the corresponding scanning areas based on the delay capabilities of the terminals to be paged, comprises:
   determining whether the terminals to be paged include a low-delay terminal based on the delay capabilities of the terminals to be paged, wherein the low-delay terminal refers to a terminal that the delay required to receive the paging signal is less than a preset threshold;
   determining a location of the low-delay terminal when the terminals to be paged include a low-delay terminal; and
   determining a scanning start point of a target beam scanning node for performing beam scanning on a target scanning area based on the location of the low-delay terminal, wherein the target beam scanning node is a beam scanning node corresponding to the target scanning area, and the target scanning area is a scanning area in the n scanning areas where the low-delay terminal is currently located.

5. The method according to claim 4, wherein performing beam scanning on the corresponding scanning areas by the n beam scanning nodes respectively based on the paging signal, and the beam scanning start point and the preset scanning direction of each of then beam scanning nodes, so as to send the paging signal to the terminals in the corresponding scanning areas by beam scanning, comprises:
    performing beam scanning on the target scanning area based on each of the paging signal, the beam scanning start point, and the preset scanning direction of the target beam scanning node for the target beam scanning node, so as to send the paging signal to the low-delay terminal by beam scanning;
    determining a preset scanning start point of the target beam scanning node after performing beam scanning on the target scanning area; and
    continuously performing beam scanning on the target scanning area based on the paging signal, the preset scanning start point, and the preset scanning direction, so as to send the paging signal to other terminals than the low-delay terminal in the target scanning area by beam scanning.

6. The method according to claim 4, wherein the determining a location of the low-delay terminal comprises:
    determining the location of the low-delay terminal based on a location at which the low-delay terminal is connected to the base station by radio resource control at the last time before the current time.

7. The method according to claim 1, prior to performing beam scanning on the corresponding scanning areas by the n beam scanning nodes respectively based on the paging signal, and the beam scanning start point and the preset scanning direction of each of then beam scanning nodes, the method further comprising a step of:
    sending notification information to the terminals in the target cell, wherein the notification information comprises time domain location information and frequency domain location information of the paging signal.

8. A paging system, comprising:
    a processor; and
    a memory for storing instructions executable by the processor;
    wherein the instructions executable by the processor contain instructions for the processor to perform the following tasks:
    determine a paging signal to be sent currently for a target cell, wherein the paging signal carries identifiers of terminals to be paged in the target cell, the target cell comprises n scanning areas corresponding to n beam scanning nodes respectively, the n beam scanning nodes are selected by a base station from m beam scanning nodes set for the target cell, the target cell is a cell, to which the paging signal is to be sent, of at least one cell managed by the base station, m is an integer greater than 1, and n is an integer greater than 1 and less than or equal to m;
    determine a scanning start point of each of the corresponding scanning areas on which the beam scanning is performed by the n beam scanning nodes respectively; and
    performing a beam scanning operation on the corresponding scanning areas by the n beam scanning nodes respectively, based on the paging signal, a beam scanning start point, and a preset scanning direction of each of the n beam scanning nodes, so as to send the paging signal to the terminals in the corresponding scanning areas by beam scanning.

9. The paging system according to claim 8, wherein the instructions executable by the processor further contain instructions for the processor to perform the following tasks:
    determine the number and locations of the terminals to be paged;
    select the n beam scanning nodes from the m beam scanning nodes set by the base station for the target cell based on the number of the terminals to be paged; and
    divide the target cell into the n scanning areas corresponding to the n beam scanning nodes respectively based on the n beam scanning nodes and the locations of the terminals to be paged.

10. The paging system according to claim 8, wherein a scanning start point of each of the corresponding scanning areas on which the beam scanning is performed by the n beam scanning nodes respectively, wherein this function further comprises the following sub-tasks:
    determine delay capabilities of each terminal to be paged, wherein the delay capabilities are configured to indicate delays required by each particular terminal to be paged to receive the paging signal; and
    determine an associated scanning start points of the n beam scanning nodes for performing beam scanning on the corresponding scanning areas, wherein each associated scanning start point is based on the delay capabilities of one or more associated terminals to be paged.

11. The paging system according to claim 10, wherein the task of determining the scanning start points of the n beam scanning nodes for performing beam scanning on the corresponding scanning areas based on the delay capabilities of the terminals to be paged, further comprises one or more sub-tasks, including:
    determine whether the terminals to be paged include a low-delay terminal based on the delay capabilities of one or more terminals to be paged, wherein the low-delay terminal refers to a terminal that the delay required to receive the paging signal is less than a preset threshold;
    determine a location of the low-delay terminal when the terminals to be paged include a low-delay terminal; and
    determine the scanning start point of a target beam scanning node for performing beam scanning on a target scanning area based on the location of the low-delay terminal, wherein the target beam scanning node is a beam scanning node corresponding to the target scanning area, and the target scanning area is a scanning area in the n scanning areas where the low-delay terminal is currently located.

12. The paging system according to claim 11, wherein the task of performing beam scanning on the corresponding scanning areas by the n beam scanning nodes respectively based on the paging signal, and the beam scanning start point and the preset scanning direction of each of the n beam scanning nodes, so as to send the paging signal to the terminals in the corresponding scanning areas by beam scanning, comprises:
    perform beam scanning on the target scanning area, based on each of the paging signal, the beam scanning start point, and the preset scanning direction of the target beam scanning node, for the target beam scanning node, so as to send the paging signal to the low-delay terminal by beam scanning;

determine a preset scanning start point of the target beam scanning node, after performing beam scanning on the target scanning area; and continuously perform beam scanning on the target scanning area based on each of the paging signal, the preset scanning start point, and the preset scanning direction, so as to send the paging signal to other terminals than the low-delay terminal in the target scanning area by beam scanning.

13. The paging system according to claim 11, wherein the task of determining a location of the low-delay terminal comprises:

determine the location of the low-delay terminal based on a location at which the low-delay terminal is connected to the base station by radio resource control (RRC) at the last time before the current time.

14. The paging system according to claim 13, wherein the instructions executable by the processor further contain instructions for the processor to perform the following tasks:

send notification information to the terminals in the target cell, wherein the notification information comprises time domain location information and frequency domain location information of the paging signal.

15. A paging device, comprising:

a processor; and a memory for storing instructions executable by the processor;

wherein the instructions executable by the processor contain instructions for the processor to perform:

determine a paging signal to be sent currently for a target cell, wherein the paging signal carries identifiers of terminals to be paged in the target cell, the target cell comprises n scanning areas corresponding to n beam scanning nodes respectively, the n beam scanning nodes are selected by a base station from m beam scanning nodes set for the target cell, the target cell is a cell, to which the paging signal is to be sent, of at least one cell managed by the base station, m is an integer greater than 1, and n is an integer greater than 1 and less than or equal to m;

determining the number and locations of the terminals to be paged;

selecting the n beam scanning nodes from the m beam scanning nodes set by the base station for the target cell based on the number of the terminals to be paged;

dividing the target cell into the n scanning areas corresponding to the n beam scanning nodes respectively based on the n beam scanning nodes and the locations of the terminals to be paged;

determining a scanning start point of each of the corresponding scanning areas on which the beam scanning is performed by the n beam scanning nodes respectively, the determining a scanning start point further comprising:

determining delay capabilities of the terminals to be paged, wherein the delay capabilities are configured to indicate delays required by the terminals to be paged to receive the paging signal; and determining, based on the delay capabilities of the terminals to be paged, the scanning start points of the n beam scanning nodes for performing beam scanning on the corresponding scanning areas; and performing beam scanning on the corresponding scanning areas by the n beam scanning nodes respectively so as to send the paging signal to the terminals in the corresponding scanning, based on the paging signal, and a beam scanning start point and a preset scanning direction of each of the n beam scanning nodes areas by beam scanning.

16. The paging device according to claim 15, wherein the determining the scanning start points of the n beam scanning nodes for performing beam scanning on the corresponding scanning areas based on the delay capabilities of the terminals to be paged, further comprises:

determining, based on the delay capabilities of the terminals to be paged, whether the terminals to be paged include a low-delay terminal, wherein the low-delay terminal refers to a terminal that the delay required to receive the paging signal is less than a preset threshold;

determining a location of the low-delay terminal when the terminals to be paged include a low-delay terminal; and determining the scanning start point of a target beam scanning node for performing beam scanning on a target scanning area, wherein the determining the scanning start point of a target beam is based on the location of the low-delay terminal, wherein the target beam scanning node is a beam scanning node corresponding to the target scanning area, and the target scanning area is a scanning area in the n scanning areas where the low-delay terminal is currently located.

17. The paging device according to claim 16, wherein the performing beam scanning on the corresponding scanning areas by the n beam scanning nodes respectively is based on the paging signal, and the beam scanning start point and the preset scanning direction of each of the n beam scanning nodes, so as to send the paging signal to the terminals in the corresponding scanning areas by beam scanning, wherein the performing beam scanning on the corresponding scanning areas further comprises:

performing beam scanning on the target scanning area based on each of the paging signal, the beam scanning start point, and the preset scanning direction of the target beam scanning node for the target beam scanning node, so as to send the paging signal to the low-delay terminal by beam scanning;

determining a preset scanning start point of the target beam scanning nod after performing beam scanning on the target scanning area, e; and continuously performing beam scanning on the target scanning area based on the paging signal, the preset scanning start point, and the preset scanning direction, so as to send the paging signal to other terminals than the low-delay terminal in the target scanning area by beam scanning.

18. The paging device according to claim 16, wherein the determining a location of the low-delay terminal further comprises a step of:

determining the location of the low-delay terminal based on a location at which the low-delay terminal is connected to the base station by radio resource control (RRC) at the last time before the current time.

19. The paging device according to claim 15, further comprising, prior to the performing beam scanning on the corresponding scanning areas by the n beam scanning nodes respectively based on the paging signal, and the beam scanning start point and the preset scanning direction of each of the n beam scanning nodes:

sending notification information to each of a plurality of terminals in the target cell, wherein the notification information comprises time domain location information and frequency domain location information of the paging signal.

20. A non-transitory computer-readable storage medium having instructions stored thereon for execution by a processor to implement the method according to claim 1.

* * * * *